(12) United States Patent
Alvi et al.

(10) Patent No.: US 9,280,876 B2
(45) Date of Patent: Mar. 8, 2016

(54) GAME LIVE AUCTION SYSTEM AND METHOD OF OPERATION

(71) Applicant: Prova Group, Inc., Dallas, TX (US)

(72) Inventors: Haroon I. Alvi, Dallas, TX (US); Charles B. Humphreyson, Dallas, TX (US); Richard L. Lackey, Dallas, TX (US); Emmitt J. Smith, III, Dallas, TX (US)

(73) Assignee: PROVA GROUP, INC., Dallas, TX (US)

( * ) Notice: Subject to any disclaimer, the term of this patent is extended or adjusted under 35 U.S.C. 154(b) by 51 days.

(21) Appl. No.: 14/022,192

(22) Filed: Sep. 9, 2013

(65) Prior Publication Data
US 2015/0072763 A1    Mar. 12, 2015

(51) Int. Cl.
| | | |
|---|---|---|
| *A63F 9/24* | (2006.01) | |
| *G07F 17/32* | (2006.01) | |
| *G06Q 20/28* | (2012.01) | |
| *G06Q 20/32* | (2012.01) | |
| *G06Q 20/34* | (2012.01) | |
| *G06Q 30/00* | (2012.01) | |
| *G06Q 30/08* | (2012.01) | |

(52) U.S. Cl.
CPC ............ *G07F 17/3286* (2013.01); *G06Q 20/28* (2013.01); *G06Q 20/3224* (2013.01); *G06Q 20/3274* (2013.01); *G06Q 20/3276* (2013.01); *G06Q 20/346* (2013.01); *G06Q 30/0185* (2013.01); *G06Q 30/08* (2013.01); *G07F 17/323* (2013.01); *G07F 17/329* (2013.01); *G07F 17/3218* (2013.01); *G07F 17/3241* (2013.01)

(58) Field of Classification Search
CPC . G07F 17/3272; G07F 17/42; G07F 17/3286; G06Q 30/0601; G06Q 30/0275; G06Q 30/0643; G06Q 30/08; G06Q 20/322
See application file for complete search history.

(56) References Cited

U.S. PATENT DOCUMENTS

| | | | |
|---|---|---|---|
| 6,707,381 | B1 | 3/2004 | Maloney |
| 2002/0049507 | A1 | 4/2002 | Hameen-Anttila |
| 2002/0152130 | A1* | 10/2002 | Salls ............................... 705/26 |
| 2002/0165817 | A1 | 11/2002 | Rackson et al. |
| 2003/0003990 | A1 | 1/2003 | Von Kohorn |
| 2003/0007464 | A1 | 1/2003 | Balani |
| 2004/0088231 | A1 | 5/2004 | Davis, Jr. |
| 2004/0098331 | A1* | 5/2004 | Benson .......................... 705/37 |

(Continued)

OTHER PUBLICATIONS

U.S. Patent and Trademark Office; PCT Application No. PCT/US14/54746; International Search Report and Written Opinion; Mar. 13, 2015.

*Primary Examiner* — Steve Rowland
(74) *Attorney, Agent, or Firm* — Jackson Walker LLP; Christopher J. Rourk

(57) ABSTRACT

A method for conducting a raffle comprising reading an item identifier from an identification tag affixed to an item at an equipment management system, prior to an event related to the item. The raffle notification data is then transmitted to users after the event has occurred. A plurality of raffle ticket purchase requests are then received from the plurality of devices and are processed. The raffle tickets are then delivered to the plurality of devices, such as in electronic form. One of the raffle tickets is then selected, and winning notification data is transmitted to the associated device. The winner can authenticate the winning item by reading the identification tag affixed to the item after the event at the equipment management system.

20 Claims, 4 Drawing Sheets

(56) References Cited

U.S. PATENT DOCUMENTS

| | | |
|---|---|---|
| 2004/0122735 A1 | 6/2004 | Meshkin |
| 2004/0171381 A1 | 9/2004 | Inselberg |
| 2005/0289061 A1 | 12/2005 | Kulakowski et al. |
| 2006/0190384 A1 | 8/2006 | Gurley et al. |
| 2007/0238501 A1 | 10/2007 | Blass |
| 2009/0198591 A1* | 8/2009 | Loeb et al. .................. 705/26 |
| 2012/0094764 A1 | 4/2012 | Kauman |
| 2013/0147607 A1 | 6/2013 | Davis, Jr. et al. |

* cited by examiner

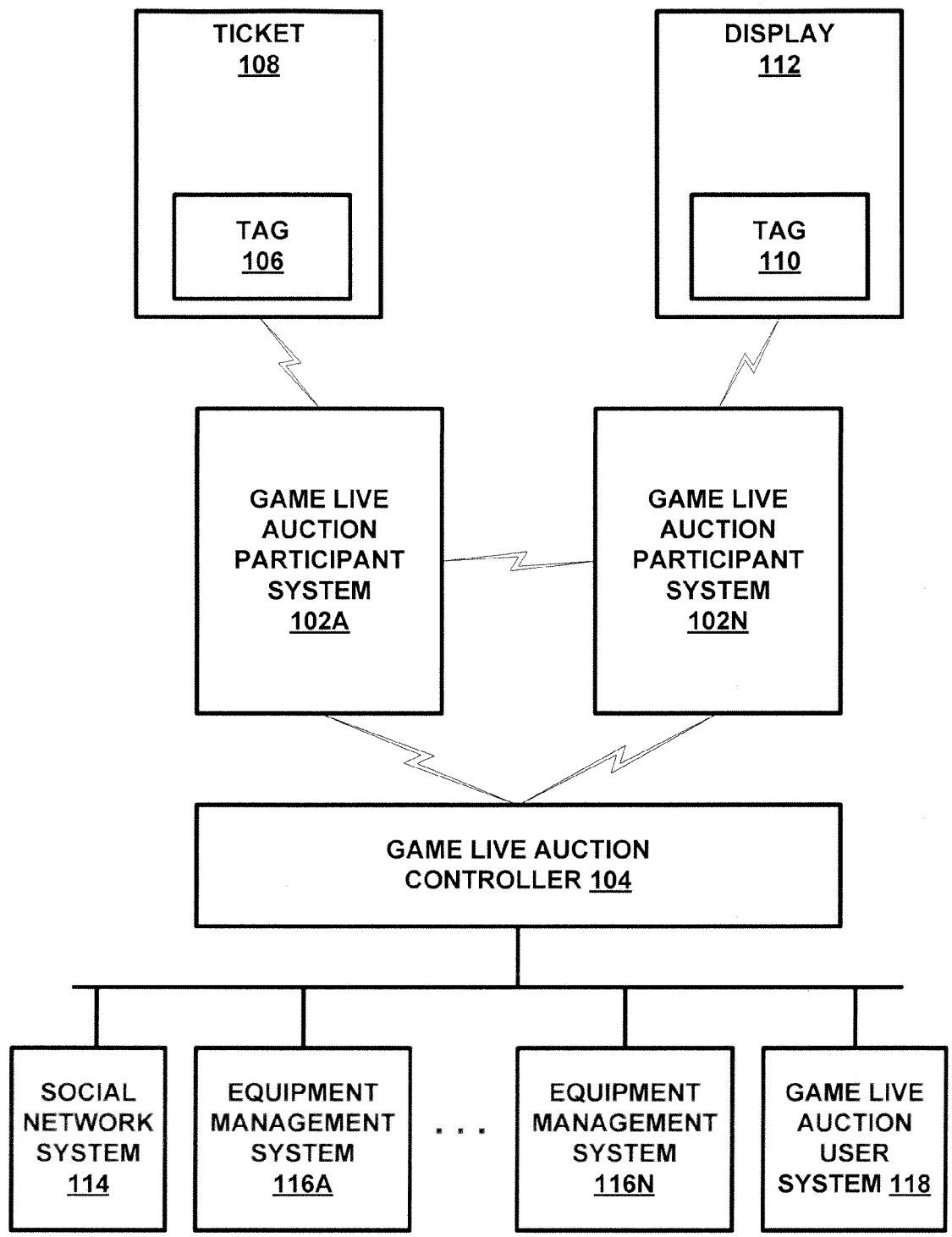
FIGURE 1    100

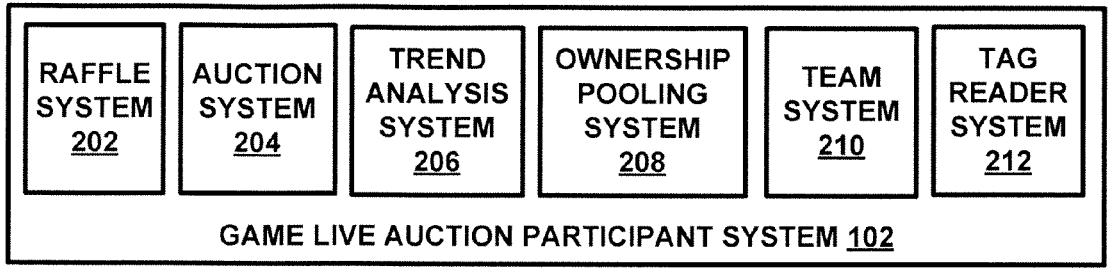
FIGURE 2      200
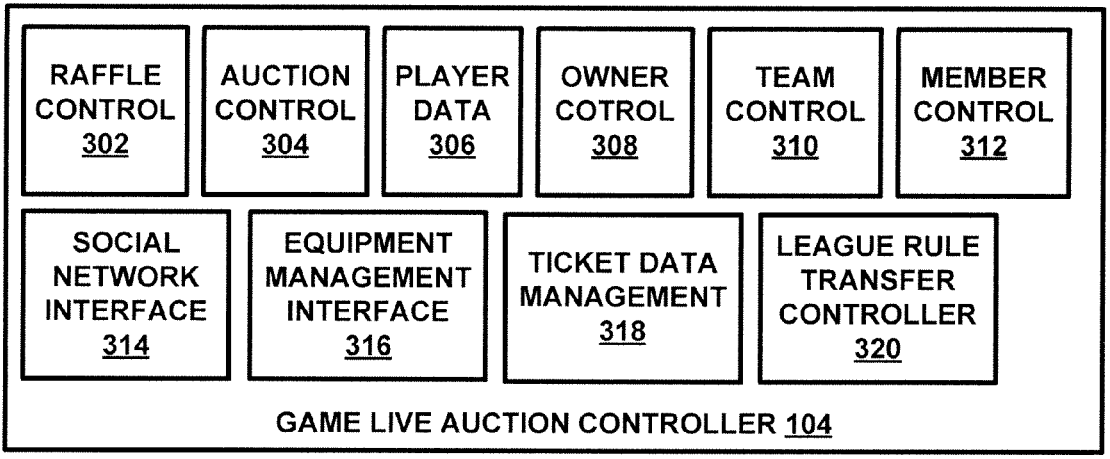
FIGURE 3      300

US 9,280,876 B2

GAME LIVE AUCTION SYSTEM AND METHOD OF OPERATION

RELATED APPLICATIONS

This application is related to pending U.S. application Ser. No. 11/430,126, filed May 8, 2006, U.S. application Ser. No. 13/758,933, U.S. application Ser. No. 13/556,002, U.S. Pat. No. 8,234,185, entitled "SYSTEM AND METHOD FOR TRACKING AUTHENTICATED ITEMS," U.S. Pat. No. 8,370,225, entitled "EQUIPMENT MANAGEMENT SYSTEM," and U.S. Pat. No. 7,840,453, entitled "EQUIPMENT MANAGEMENT SYSTEM," each of which is hereby incorporated by reference for all purposes as if set forth herein in its entirety.

TECHNICAL FIELD

The present application relates generally to auctions, and more specifically to a system and method for offering items for auction or raffle during a sporting event or other event.

BACKGROUND OF THE INVENTION

Auctions of items generally relate to items that can be appraised and inspected prior to the auction, so as to allow a prospective bidder to ascertain the value of the item prior to bidding.

SUMMARY OF THE INVENTION

A method for conducting a raffle comprising reading an item identifier from an identification tag affixed to an item at an equipment management system, prior to an event related to the item. The raffle notification data is then transmitted to users after the event has occurred. A plurality of raffle ticket purchase requests are then received from the plurality of devices and are processed. The raffle tickets are then delivered to the plurality of devices, such as in electronic form. One of the raffle tickets is then selected, and winning notification data is transmitted to the associated device. The winner can authenticate the winning item by reading the identification tag affixed to the item after the event at the equipment management system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system for game live auctioning in accordance with an exemplary embodiment of the present disclosure;

FIG. 2 is a diagram of a participant system for game live auctioning in accordance with an exemplary embodiment of the present disclosure;

FIG. 3 is a diagram of a game live auctioning controller in accordance with an exemplary embodiment of the present disclosure;

DETAILED DESCRIPTION OF THE INVENTION

Figure 4:
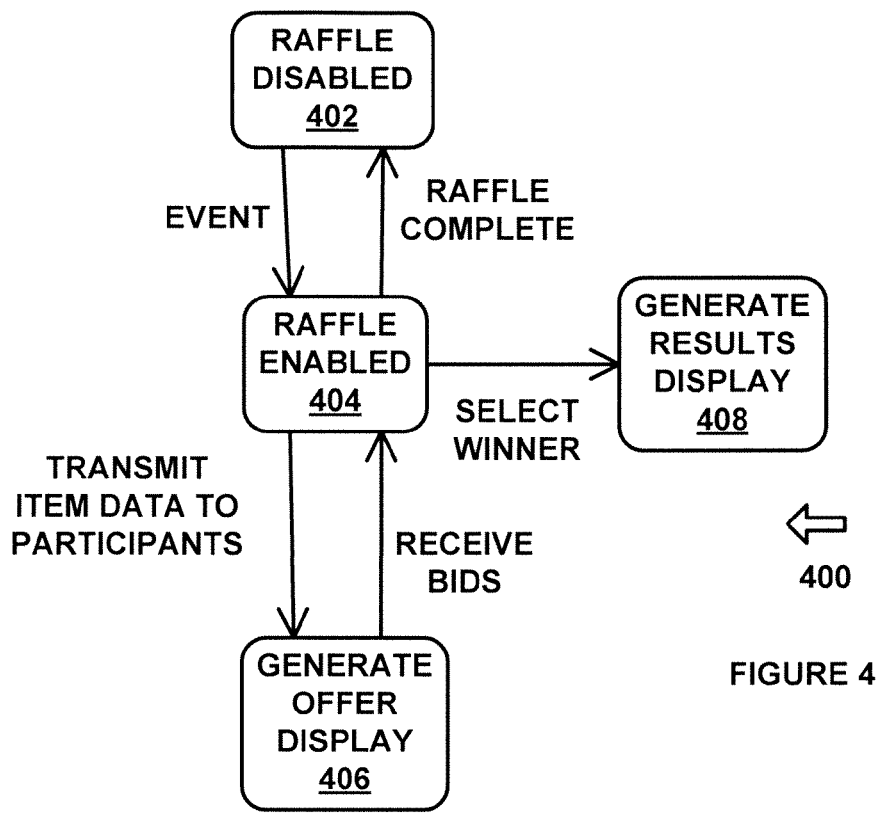
FIG. 4 is a state diagram for managing a game live raffle in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for game live auctioning in accordance with an exemplary embodiment of the present disclosure. System 100 can be implemented in hardware or a suitable combination of hardware and software, and can include one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as keyboards or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes game live auction participant systems 102A through 102N, which can be cellular communications devices with one or more processors and associate hardware and software systems or other suitable devices. Each game live auction participant system 102A through 102N is typically carried by a spectator at a sporting event or other suitable events, including but not limited to football games, baseball games, basketball games, hockey games, golf tournaments, automobile racing events, Olympic games, soccer games, tennis tournaments, horse races, polo games, musical events, gun shows, boat shows, sport personality conventions or signing events, entertainment personality conventions or signing events, trade shows or other suitable events.

In one exemplary embodiment, each game live auction participant system 102A through 102N can be associated with one or more tickets 108 (which can be fabricated from paper, plastic or other suitable materials), which can have one or more embedded or embossed tag 106. In this exemplary embodiment, the tag 106 can be a near field communication (NFC) tag, a radio frequency identification (RFID) tag, a smart card, a bar code, an Aztec code, a data matrix, a high capacity color barcode, a maxicode, a PDF 417, a QR code, a ShotCode, a SparqCode, a nanotag or other suitable embedded or embossed tags. Each game live auction participant system 102A through 102N can be activated for bidding at an event by scanning one or more of the associated tickets for that event, by using an event-specific radio beacon, by using event-specific Global Positioning System (GPS) coordinates, or in other suitable manners so as to limit participants to persons that are physically in attendance at the event. Likewise, bidding on certain items can be limited to participants at the event, and bidding on other items can be open to non-participants, such as through game live auction user system 118 or in other suitable manners.

In another alternative embodiment, a user of game live auction participant systems 102A through 102N can scan tag 106 on their ticket 108, and can use their associated game live auction participant system for access to the sporting event. Game live auction participant systems 102A through 102N can also be used to scan tag 110 of display 112, so as to validate attendance at an event, attendance within a class of seating at an event, to receive incentives such as t-shirts or refreshments, to obtain additional information about the event, or for other suitable purposes.

Each game live auction participant system 102A through 102N can be used to bid on items, to purchase raffle items, or to otherwise participate in game live event auctions or sales. In one exemplary embodiment, game live auction controller 104 can interface with one or more equipment management systems 116A through 116N, which can be used to check items out for use in an event, and to check the items back in after the event, so as to authenticate that the item was in use at the event. In this exemplary embodiment, a player may have a number of items for a season, such as jerseys, helmets, bats, rackets or other items that may be of subsequent interest to collectors. System 100 allows a user of game live auction participant system 102 to enter bids or to purchase raffle tickets to obtain such items after the event, and interfaces with the equipment management system 116 at the event to ensure that the correct item is transferred to the buyer. In this manner, the buyer is protected from inadvertently obtaining one of the duplicate items, which might not have been used in the event and which may vary slightly from the item that was used in the event. For example, notable items have had to be removed from sale due to discrepancies between the item and photographs of the item at the sporting event, such that data generated by system 100 can be used to authenticate items prior to removal from the event so as to verify that the proper item is being transferred to the buyer. In addition, unlike common auction items that must be available for inspection prior to the auction to ascertain their authenticity, items that become valuable during an event must be authenticated by determining that the item was in fact used during the event, which can only be determined if the item is checked out to a player/user prior to use, if the player/user is observed using the item during the event, and where the item is subsequently checked back into an equipment management system or other suitable systems after the event by the player/user, so that the chain of custody of the item can be conclusively determined.

In another exemplary embodiment, one game live auction participant system 102A can interface with one or more additional game live auction participant systems 102N, such as to allow users to collaborate on purchasing an item, to transfer an item that one user has to another user (such as using the systems and methods described in U.S. Pat. No. 8,234,185, entitled "System and method for tracking authenticated items," or U.S. Pat. Nos. 8,370,225 or 7,840,453, each entitled "Equipment Management System," each of which is hereby incorporated by reference for all purposes as if set forth herein in their entirety), or for other suitable purposes. In this exemplary embodiment, one of the game live auction participant systems 102A through 102N can be given authority to bid on an item, and ownership between the collaborators can be decided in advance of bidding, such as to allow two or more individuals to jointly own an item even when only a single individual is present at the event to bid on the item. In addition, ownership collaboration can be extended to social network members, such as through social network system 114, where more complicated ownership and transfer processing can be performed than between individual users, or other suitable processes can also or alternatively be used. Classes of ownership can be created, such as classes that come with voting privileges to approve a sale or transfer to another party, classes that define the percentage of any sales proceeds that a specific owner will receive, classes of owners that will be allowed to attend an event associated with the item (such as signing of jerseys or autographs by the sporting personality that is associated with the item), or other suitable classes. In another exemplary embodiment, users can contribute to an organization, such as a sports museum, to allow the organization to bid on an item, in exchange for admission to the organization, an event, or other suitable incentives.

In operation, system 100 allows attendees at a sporting event or other suitable events to participate in auctions, raffles or other sales of items at the sporting event, and to obtain the items after the event in a manner that allows them to authenticate that they are receiving the actual item that they were bidding on. System 100 further allows attendees to pool resources to bid on items, to transfer items that they have already acquired, or to otherwise obtain and convey items that have acquired value during an event.

FIG. 2 is a diagram of a system 200 for participant involvement in game live auctioning in accordance with an exemplary embodiment of the present disclosure. System 200 includes raffle system 202, auction system 204, trend analysis system 206, ownership pooling system 208, team system 210 and tag reader system 212, each of which can be implemented in hardware or a suitable combination of hardware and software, and which can be one or more software systems operating on a processor.

Raffle system 202 can be implemented as one or more objects that each have associated data, functional and graphical attributes, such as in a software application operating on a smart phone or in other suitable manners. In one exemplary embodiment, raffle system 202 can be activated prior to or during an event, such as to allow attendees at the event to purchase one or more raffle tickets. In this exemplary embodiment, the raffle tickets can be offered to each attendee at an event, a smaller number of raffle tickets can be offered to the first attendees to purchase them (such as by generating a notification during the event that can only be seen by attendees), or in other suitable manners. In another exemplary embodiment, a predetermined event can be identified, such as the first player to score a touchdown, and raffle tickets can be sold prior to the predetermined event up until the time of the predetermined event, so as to create a stochastic and dynamic raffle. In another exemplary embodiment, the sales of the raffle tickets can be initiated upon the occurrence of the predetermined event, and the raffle drawing can be performed after a predetermined period of time, a predetermined number of ticket sales, or in other suitable manners. In another exemplary embodiment, raffle tickets can be advertised to users that have previously bid on items for a specific player, users that have seats in predetermined areas, or other suitable groups of users.

Auction system 204 can be implemented as one or more objects that each have associated data, functional and graphical attributes, such as in a software application operating on a smart phone or in other suitable manners. In one exemplary embodiment, auction system 204 can be activated prior to or during an event, such as to allow attendees at the event to participate in the auction. In this exemplary embodiment, the auction items can be identified prior to the event, can be identified as they are checked in by participants in the event, or in other suitable manners. During the event, attendees or other suitable persons can be allowed to bid on the items, and bidding can be closed at a predetermined time, such as at the end of the event, five minutes after the end of the event or at other suitable times. It has been observed that the most bidding activity occurs shortly before a known auction end time, such that by assigning a dynamic and stochastic auction end time to the auction, participants are incentivized to bid earlier, particularly when the end of the auction is tied to an event that might be of viewing interest to a participant.

Trend analysis system 206 can be implemented as one or more objects that each have associated data, functional and graphical attributes, such as in a software application operating on a smart phone or in other suitable manners. In one exemplary embodiment, trend analysis system 206 allows a user to analyze trends to determine whether to place a bid on an item. In this exemplary embodiment, a player's performance during a game may affect the maximum bid value for an item, such as where the player is close to surpassing a record for that event (such as the number of yards rushed, the number of points scored, or the number of quarterback sacks). Trend analysis system 206 allows a bidder to analyze data and statistics during the game to identify trends, so as to guide bidding or for other suitable purposes.

Ownership pooling system 208 can be implemented as one or more objects that each have associated data, functional and graphical attributes, such as in a software application operating on a smart phone or in other suitable manners. In one exemplary embodiment, ownership pooling system 208 allows two or more individuals to pool an ownership interest in an item that is being bid on. In this exemplary embodiment, a first individual can generate an offer for one or more additional individuals, such as to offer joint ownership of an item based on pro rata amounts invested in purchasing the item, the right to control subsequent transfers of the item, or other suitable ownership structures. An attendee at a sporting event can act as a proxy for non-attendees, such as to allow the attendee to bid on items for non-attendees. Likewise, a number of attendees can pool resources, such as where the amount that is being bid for an item exceeds the bidding authorization or deposit requirements of each bidder. For example, bidders can be required to have a line of credit, cash on deposit or other types of security, such that a bidder can be excluded from bidding on an item if the bidder has insufficient funds to do so. Ownership pooling system 208 allows two or more bidders to join resources in a predetermined manner, and allows the ownership and subsequent transfer of ownership of such items to be controlled as a function of the predetermined owners and ownership interests, such as to allow one joint owner to sell their ownership to a third party, to restrict transfers of possession of an item unless the transfer is authorized by each owner, or in other suitable manners.

Team system 210 can be implemented as one or more objects that each have associated data, functional and graphical attributes, such as in a software application operating on a smart phone or in other suitable manners. In one exemplary embodiment, team system 210 allows a user to create a fantasy team, such as based on a bidding process, based on players that a user has purchased an item for, or in other suitable manners. Likewise, team system 210 can be used to identify users that will be allowed to purchase raffle tickets, to bid on items, or for other suitable purposes. Team system 210 can also interface with one or more external fantasy team systems, such as systems that coordinate fantasy team leagues for users.

Tag reader system 212 can be implemented as one or more objects that each have associated data, functional and graphical attributes, such as in a software application operating on a smart phone or in other suitable manners. In one exemplary embodiment, tag reader system 222 allows a user of system 200 to read a tag on a ticket, a poster, an item of clothing, a collectible item, a piece of sporting equipment or other suitable items, to interface with tag reader systems 212 of other devices, to interface with a point of sale device, or for other suitable purposes. In this exemplary embodiment, tag reader system 212 can be an electronic field generator and antenna and associated operating systems that can be used to interrogate an NFC tag, an RFID tag or other suitable radio frequency tags, an optical scanner or camera and associated operating systems that can be used to read optical tags, a nanotag reader, a magnetic field reader or other suitable systems or devices. Tag reader system 212 can include embedded encryption systems that allow tag data to be encrypted prior to processing by an operating system, so as to protect the tag data from being compromised by malware or other hostile programs. Tag reader system 212 can also interface with game live auction controller 104 or other suitable systems so as to provide the tag data on demand, at predetermined times, using predetermined protocols, or in other suitable manners. Tag reader system 212 can interface with raffle system 202, auction system 204 or other suitable systems to authenticate an item that the user has acquired, such as by storing a first code that was retrieved from a tag on the item prior to the item being checked out for use in an event and comparing that code to a code that is read from the item by tag reader system 212.

In operation, system 200 allows a user to participate in raffles, auctions and other activities at events, so as to allow the user to purchase items that were used in the event and to determine the authenticity of the item. System 200 also allows the user to pool resources with other users to acquire items, to control joint ownership of items, to create and interface with fantasy teams, and to perform other suitable functions.

FIG. 3 is a diagram of a system 300 for controlling game live auctioning in accordance with an exemplary embodiment of the present disclosure. System 300 includes raffle control 302, auction control 304, player data 306, owner control 308, team control 210, member control 312, social network interface 314, equipment management interface 316, ticket data management 318 and league rule transfer controller 320, each of which can be implemented in hardware or a suitable combination of hardware and software, and which can be one or more software systems operating on a processor.

Raffle control 302 can control the timing and actions of a raffle, such as to identify users that will be permitted to participate in a raffle, to select the item that will be raffled, to initiate and terminate raffle sales, to select or interface with a system for selecting a winner, and to control subsequent transfer of the raffled item to the winner. In one exemplary embodiment, an attendee at an event can be allowed to purchase one or more raffle tickets. In this exemplary embodiment, the raffle tickets can be offered to each attendee at an event, a smaller number of raffle tickets can be offered to the first attendees to purchase them (such as by generating a notification during the event that can only be seen by attendees), or in other suitable manners. In another exemplary embodiment, a predetermined event can be identified, such as the first player to score a touchdown, and raffle tickets can be sold prior to the predetermined event up until the time of the predetermined event, so as to create a stochastic and dynamic raffle. In another exemplary embodiment, the sales of the raffle tickets can be initiated upon the occurrence of the predetermined event, and the raffle drawing can be performed after a predetermined period of time, a predetermined number of ticket sales, or in other suitable manners. In another exemplary embodiment, raffle tickets can be advertised to users that have previously bid on items for a specific player, users that have seats in predetermined areas, or other suitable groups of users. Raffle control 302 is used to interface with raffle system 202 on each user device, to control sales of raffle tickets, to control selection and identification of items, and for other suitable purposes.

Auction control 304 can be activated prior to or during an event, such as to allow attendees at the event to participate in the auction. In this exemplary embodiment, the auction items can be identified prior to the event, can be identified as they are checked in by participants in the event, or in other suitable manners. Auction control 304 can obtain item data from equipment management interface 316 or in other suitable manners. During the event, attendees or other suitable persons can be allowed to bid on the items, and bidding can be closed at a predetermined time, such as at the end of the event, five minutes after the end of the event or at other suitable times. It has been observed that the most bidding activity occurs shortly before a known auction end time, such that by assigning a dynamic and stochastic auction end time to the auction, participants are incentivized to bid earlier, particularly when the end of the auction is tied to an event that might be of viewing interest to a participant. Auction control 304 controls bidding processes, such as by determining whether a user is authorized to bid, by determining the amounts that a user has on deposit or the amount of credit that the user has, by generating a notification of a current maximum bid, by determining the user that placed the winning bid, by tracking the identifier for items to ensure that the chain of custody is controlled, and in other suitable manners.

Player data 306 provides real time data for players at an event. In one exemplary embodiment, players at an event can be monitored for the purpose of selecting items for raffle, for selecting items that are activated for bidding, to close bidding on items or for other suitable purposes. In this exemplary embodiment, the player data that is generated as a result of such real time monitoring can be of interest to persons that are performing trend analysis, to fantasy team owners or to other persons.

Owner control 308 allows two or more individuals to pool an ownership interest in an item that is being bid on. In one exemplary embodiment, a first individual can generate an offer for one or more additional individuals, such as to offer joint ownership of an item based on pro rata amounts invested in purchasing the item, the right to control subsequent transfers of the item, or other suitable ownership structures. In this exemplary embodiment, an attendee at a sporting event can act as a proxy for non-attendees, such as to allow the attendee to bid on items for non-attendees. Likewise, a number of attendees can pool resources, such as where the amount that is being bid for an item exceeds the bidding authorization or deposit requirements of each bidder. For example, bidders can be required to have a line of credit, cash on deposit or other types of security, such that a bidder can be excluded from bidding on an item if the bidder has insufficient funds to do so. Owner control 308 allows two or more bidders to join resources in a predetermined manner, and allows the ownership and subsequent transfer of ownership of such items to be controlled as a function of the predetermined owners and ownership interests, such as to allow one joint owner to sell their ownership to a third party, to restrict transfers of possession of an item unless the transfer is authorized by each owner, or in other suitable manners.

Team control 310 allows users to create fantasy teams, such as based on a bidding process, based on players that a user has purchased an item for, or in other suitable manners. Likewise, team control 310 can be used to identify users that will be allowed to purchase raffle tickets, to bid on items, or for other suitable purposes. Team control 310 can also interface with one or more external fantasy team systems, such as systems that coordinate fantasy team leagues for users.

Member control 312 manages user access to item data as a function of membership classes. In one exemplary embodiment, access to auctions or raffles can require creating an account having a first level of membership, where creating the account requires the user to agree to use and transfer rules, to provide identifying information that is used to prevent fraud, and for other suitable purposes. Access to additional features and functionality can be offered in conjunction with paid membership, such as the ability to list items for sale, the ability to search items for sale, the ability see other user's collections, the ability to prevent your collection from being seen by others, the ability to send messages to other users and other suitable features and functions.

Social network interface 314 allows users to configure a social network account to receive item data. In one exemplary embodiment, a social network account can be created by a user, and the user's item data can be sent to the user's social network account, such as to generate notifications that the user is bidding on an item, has won an item, has an item for sale, or for other suitable purposes. In another exemplary embodiment, a group of users can be joint owners of one or more items, and a social network account that is under the control of one or more users can be enabled to receive data concerning the item, such as its current location, whether it is for sale, associated audiovisual data for the item or other suitable data.

Equipment management interface 316 receives and transmits data to one or more equipment management systems 116A through 116N, such as to allow the items that are being used in an event to be reported to system 300 for raffle or auction, to allow a user that won or purchased an item to authenticate the item when the user wants to collect the item after the event, or for other suitable purposes.

Ticket data management 318 allows users to be identified as a function of ticket data, such as to confirm that a user is in attendance at an event, to identify users for raffles based on seating, to allow users to scan ticket information into a device to be used in place of the physical ticket or for other suitable purposes.

League rule transfer controller 320 applies one or more league rules for controlling transfer of game worn sports gear. In one exemplary embodiment, each sporting league may have rules associated with ownership of game worn sporting gear, such as to allow a player to have a first right of refusal to purchase a game worn item or piece of sports equipment at an auction price, to allow players to independently control the sale of game worn items, or other suitable rules. Likewise, each sporting league may have rules regarding approved sellers of official league clothing or equipment. League rule transfer controller 320 can be updated by each league or other authorized individuals so as to provide control for transfers of such items.

In operation, system 300 controls raffles, auctions and other functions related to items used in events, so as to allow event attendees to participate in raffles or auctions, to allow users to obtain data about players at events, to allow users to form fantasy teams and for other suitable purposes.

FIG. 4 is a state diagram 400 for managing a game live raffle in accordance with an exemplary embodiment of the present disclosure. State diagram 400 can be implemented in hardware or a suitable combination of hardware and software, such as one or more algorithms operating on one or more processors, or in other suitable manners. Although state diagram 400 is shown, other suitable processes can be used to model or implement the associated algorithms, such as one or more flow charts.

State diagram 400 includes raffle disabled state 402, which is the quiescent state for a raffle system. When an event occurs, such as when data is received at a processor on which one or more algorithms implementing state diagram 400 is operating that represents that a predetermined event in a game has occurred (such as a first touchdown, a first interception, a first quarterback sack or other suitable events), that a predetermined amount of time has elapsed (such as one quarter), that a randomly generated trigger has been received, after a combination of such events (such as where a random player is selected if no player scores in the first half), or after other suitable events, the state transitions to raffle enabled state 404. At raffle enabled state 404, data defining the item being raffled is received or retrieved, such as data identifying the type of item (jersey, helmet, game item or other suitable items), data identifying the associated personality (player, performer, jockey or other suitable persons), season statistics or other suitable data. A number of raffle tickets (e.g. where the number of raffle tickets is based on the number of potential purchasers), prospective raffle participants (e.g. where the prospective raffle participants are limited to persons holding tickets in a predetermined section or of a predetermined type), raffle ticket identification numbers, raffle ticket prices, or other suitable raffle ticket data can also or alternatively be generated. The raffle ticket data is then transmitted to prospective participants, and the state diagram migrates to generate offer display state 406.

At offer display state 406, a plurality of processors, each held or operated by a game live auction participant or other suitable persons, each receives the raffle data and generates a raffle offer display. In one exemplary embodiment, the raffle offer display can be an alert, an icon, a graphic user interface, a text message, an audiovisual display or other suitable displays that are configured to draw the attention of the user of a game live auction participant system or other suitable systems, so as to allow the user to decide whether to purchase a raffle ticket. The user can be limited to a single raffle ticket, a predetermined number of raffle tickets, the number of raffle tickets can change over time (such as to allow users to buy one ticket for a predetermined period of time and then to buy additional tickets after that time elapses and until all tickets are sold), or other restrictions can be placed on the number of raffle tickets that a single user can purchase. The raffle controller processor receives the purchase requests for raffle tickets from the plurality of processors that are generating the offer display and processes the requests, such as to process credit or debit payment transactions, to deduct a raffle ticket fee from a prepaid account, or in other suitable manners. Each display on the buyer's processors can time out after a predetermined period of time, can change state after a purchase is made, can be replaced with a display reflecting the purchase or end of the purchase period, or other suitable state changes can also or alternatively be implemented.

After a predetermined period of time, a predetermined number of ticket sales or other suitable events, the raffle is concluded and a winning ticket is selected. In one exemplary embodiment, a predetermined number of paper tickets or other embossed items can be generated prior to the raffle, and a person selected from the crowd or other suitable persons can be used to manually select a winning raffle number. Likewise, a random drawing can be held using a random number generator or items such as markers, ping pong balls, or other suitable items to select a sequence of numerical, alphanumerical, or other suitable identifiers, and the winning ticket number can be selected. State diagram 400 then migrates to generate results display state 408, where the name of the winner, winning ticket number or other suitable data is displayed.

In operation, state diagram 400 allows a game live raffle to be implemented, where the item raffled and the start of the raffle can be based on a random event (such as when a player accomplishes a predetermined objective), a predetermined period of time, or other suitable criteria. State diagram 400 allows suitable raffle ticket sales rules and ticket selection processes to be implemented, as well as ticket sale processing and other administrative processes, and can interface with physical data processes such as random number selection devices or items, to ensure that the results of the raffle are random.

Figure 5:
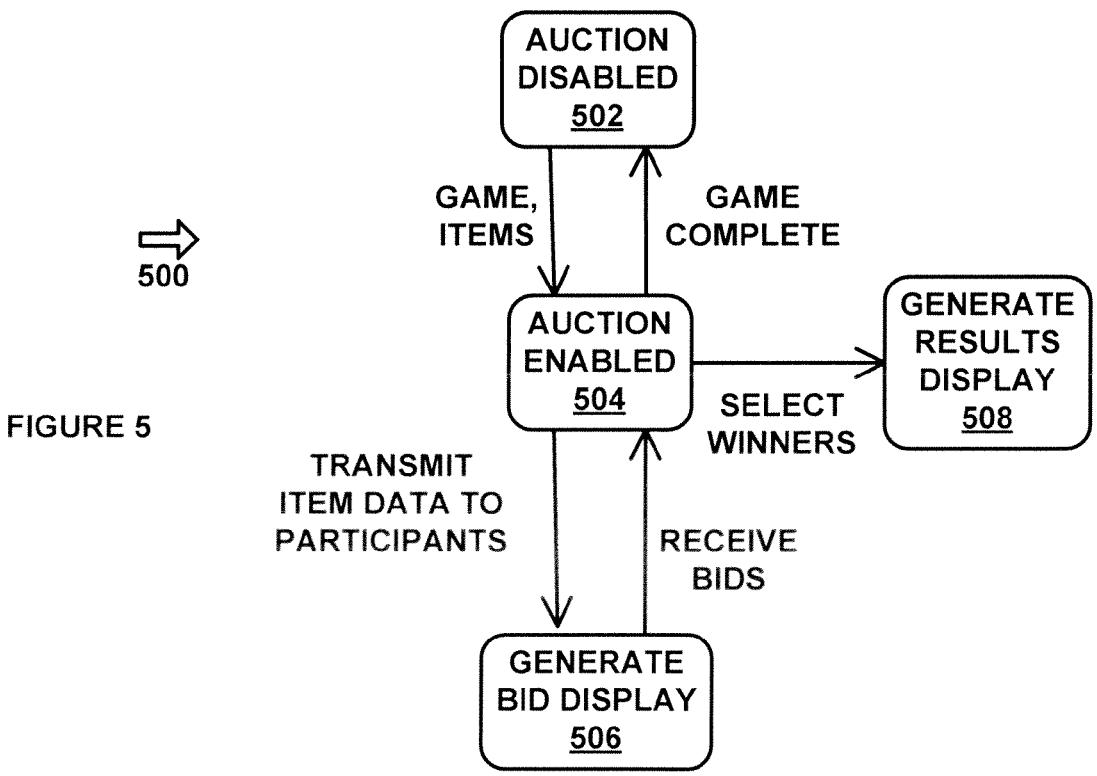
FIG. 5 is a state diagram for managing a game live auction in accordance with an exemplary embodiment of the present disclosure.

FIG. 5 is a state diagram 500 for managing a game live auction in accordance with an exemplary embodiment of the present disclosure. State diagram 500 can be implemented in hardware or a suitable combination of hardware and software, such as one or more algorithms operating on one or more processors, or in other suitable manners. Although state diagram 500 is shown, other suitable processes can be used to model or implement the associated algorithms, such as one or more flow charts.

State diagram 500 includes auction disabled state 502, which is the quiescent state for an auction system. When an event occurs, such as when data is received at a processor on which one or more algorithms implementing state diagram 500 is operating that represents that a predetermined event in a game has occurred (such as the beginning of the game, the receipt of all player data for the game or other suitable events), that a predetermined amount of time has elapsed (such as one quarter), that a randomly generated trigger has been received, after a combination of such events (such as where a random player is selected if no player scores in the first half), or after other suitable events, the state transitions to auction enabled state 504. At auction enabled state 504, data defining the items being auctioned is received or retrieved, such as data identifying the type of item (jersey, helmet, game item or other suitable items), data identifying the associated personality (player, performer, jockey or other suitable persons), season statistics or other suitable data. Auction parameters (e.g. a minimum bid, a reserve or other suitable parameters), prospective auction participants (e.g. where the prospective auction participants are limited to persons holding tickets in a predetermined section, of a predetermined type, having a predetermined credit limit or amount of funds on deposit), or other suitable auction data can also or alternatively be generated. The auction data is then transmitted to prospective participants, and the state diagram migrates to generate bid display state 506.

At generate bid display state 506, a plurality of processors, each held or operated by a game live auction participant or other suitable persons, each receives the auction data and generates an auction display. In one exemplary embodiment, the auction display can be an alert, an icon, a graphic user interface, a text message, an audiovisual display or other suitable displays that are configured to draw the attention of the user of a game live auction participant system or other suitable systems, so as to allow the user to decide whether to participate in the auction. The user can also or alternatively search available lots, collaborate with other users to purchase an item as joint owners (as described herein in other suitable manners), bid on an item, set a maximum amount to be bid, can request alerts, or other suitable auction processes can be implemented. In one exemplary embodiment, a user can provide alert settings prior to a game, a season or at other suitable times, can receive alerts of items that are available for bidding based on one or more conditions specified by the user, or can otherwise generate bid data. The auction controller processor receives the bid data from the plurality of processors that are generating the bid display and processes the requests, such as to process credit or debit payment pre-authorization transactions, to place a hold on funds in a prepaid account, or in other suitable manners.

After a predetermined period of time, a predetermined event (such as the end of the game) or other suitable events, the auction is concluded and winning lots are selected. State diagram 500 then migrates to generate results display state 508, where the name of the winners, winning lots or other suitable data is displayed.

In operation, state diagram 500 allows a game live auction to be implemented, where the items auctioned and the end of the auction can be based on a random event (such as the end of the game), a predetermined period of time, or other suitable criteria. State diagram 500 allows suitable auction sales rules and auction processes to be implemented, as well as auction processing and other administrative processes.

Figure 6:
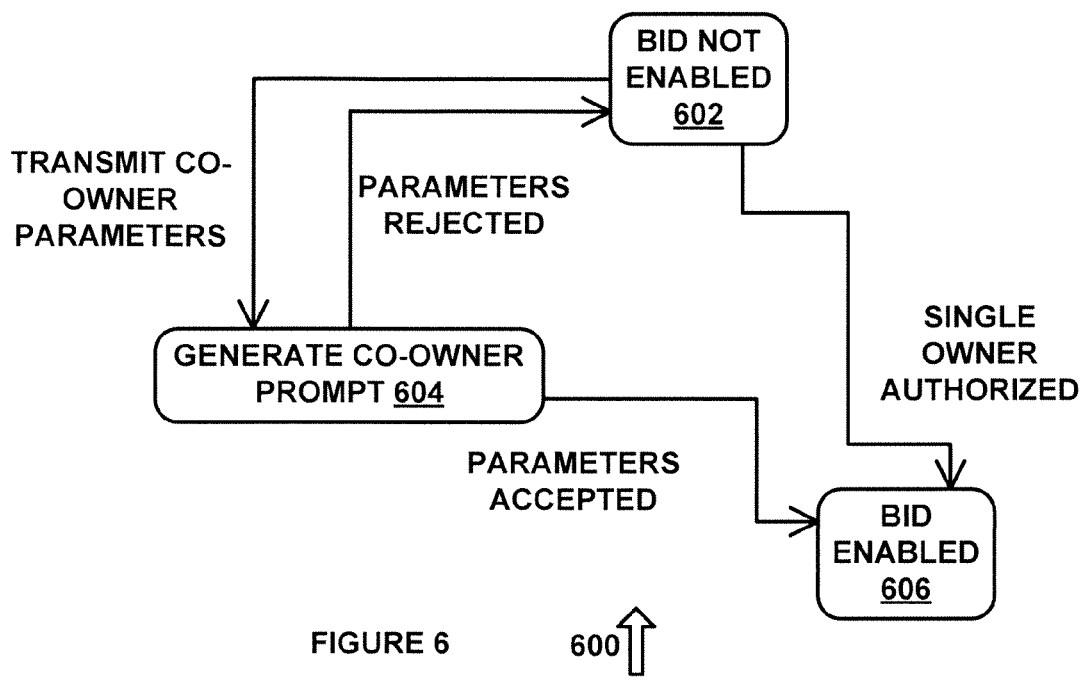
FIG. 6 is a state diagram for managing joint ownership of an item in a game live auction in accordance with an exemplary embodiment of the present disclosure.

FIG. 6 is a state diagram 600 for managing joint ownership of an item in a game live auction in accordance with an exemplary embodiment of the present disclosure. State diagram 600 can be implemented in hardware or a suitable combination of hardware and software, such as one or more algorithms operating on one or more processors, or in other suitable manners. Although state diagram 600 is shown, other suitable processes can be used to model or implement the associated algorithms, such as one or more flow charts.

State diagram 600 includes bid not enabled state 602, which is the quiescent state for bidding in an auction system, and which can exist on a user's auction interface system, on the auction system that the user interfaces with and on other suitable systems. If a user wants to bid individually on an item, the user can transmit individual bid request data, and if the single user/owner has sufficient credit or funds on deposit, then state diagram 600 can migrate to bid enabled state 606. Alternatively, a user can determine that they do not have sufficient funds to bid on an item, and can generate co-ownership parameters that are transmitted to one or more other processors associated with other users, either directly, through an auction processor or in other suitable manners. State diagram 600 then transitions to generate co-owner prompt state 604, where the one or more other processors for the other users can receive the co-ownership parameters. In one exemplary embodiment, a user can define the parameters using a processor based on how much funding is being sought, whether the co-owner will own equally or in proportion to funds contributed, whether the co-owner will be able to vote on subsequent transfers, whether the co-owner will receive a pro-rata share of subsequent sales of the item, the entity that will take possession of the item, or other suitable joint ownership parameters. The parameters can then be transmitted to one or more other processors, which can generate a display identifying the parameters, other prospective co-owners, or other suitable data. If the parameters are accepted, state diagram 600 migrates to bid enabled state, otherwise, if the parameters are rejected, state diagram 600 migrates back to bid not enabled state, and the first user can be notified of the rejection of the parameters, can be presented with alternative parameters, or other suitable processes can also or alternatively be used. Likewise, if multiple users are capable of accepting parameters that will enable bidding and a first user accepts, state diagram 600 can prompt the initiator to accept the first user, to wait on additional users or to perform other suitable functions. In this manner, the first user can create an incentive for one of the other users to accept the offer without counter offering.

Figure 7:
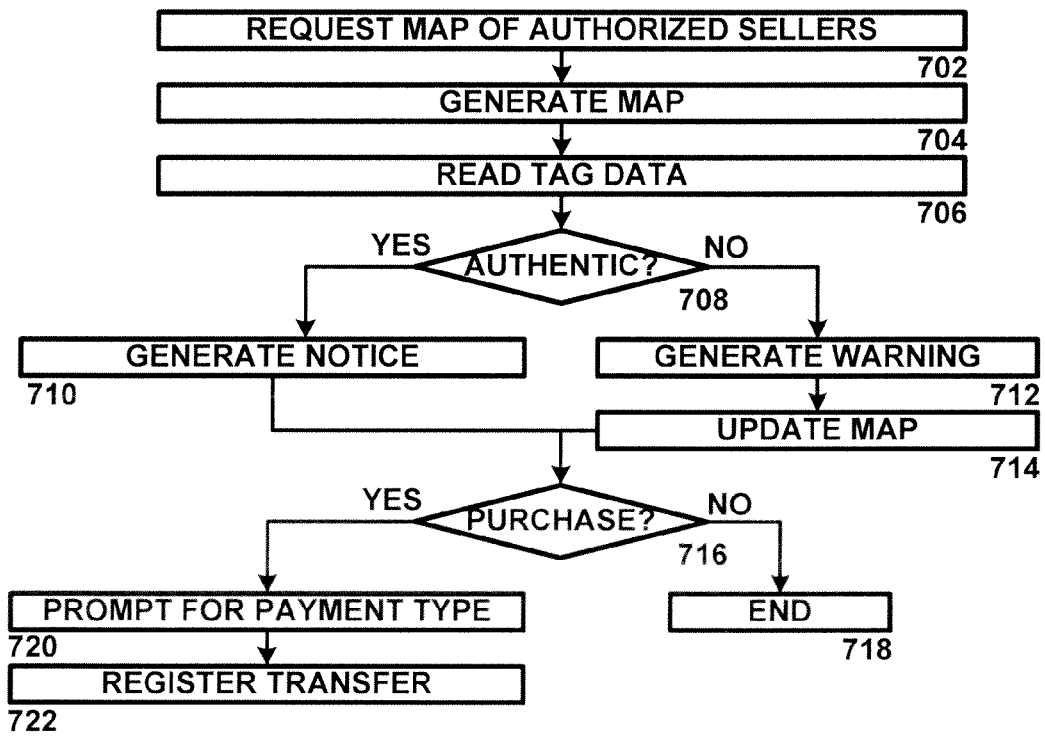
FIG. 7 is a diagram of an algorithm for locating authorized merchants in accordance with an exemplary embodiment of the present disclosure.

FIG. 7 is a diagram of an algorithm 700 for locating authorized merchants in accordance with an exemplary embodiment of the present disclosure. Algorithm 700 can be implemented in hardware or a suitable combination of hardware and software, such as one or more algorithms operating on one or more processors, or in other suitable manners. Although algorithm 700 is shown as a flow chart, other suitable processes can be used to model or implement algorithm 700, such as one or more state diagrams.

Algorithm 700 begins at 702, where a map of authorized sellers is requested. In one exemplary embodiment, a user can be looking for authorized sellers of authentic merchandise, such as league authorized jerseys or apparel, where one or more merchants are mobile and set up a sales location outside of the venue at which a sporting event is taking place. In such circumstances, there may be a number of sellers of unauthorized merchandise in the same vicinity, and method 700 can be used to avoid such sellers and their counterfeit items of inferior quality. The algorithm then proceeds to 704.

At 704, a map is generated, such as on a handheld electronic device of the user. The map can include the user's current location and the location of one or more of the nearest sellers of authentic merchandise. The algorithm then proceeds to 706, where a user can scan in the identification tag on the item. In one exemplary embodiment, authentic items can be tagged at a manufacturing site with a readable tag, such as an NEC tag, an RFID tag, an optical tag or other suitable tags, such that a user with a handheld electronic device can read the tag data and transmit it to a remote location for authentication. The algorithm then proceeds to 708.

At 708, it is determined whether the tag has been authenticated. In one exemplary embodiment, authentication can include providing an image of the article that the tag was provided for, to allow the user to authenticate the item. Likewise, a tag serial number or other associated data can also or alternatively be provided as part of the authentication process, such as to allow the tag reader and associated systems to authenticate the tag. If it is determined that the tag and associated item is authentic, the algorithm proceeds to 710 where a notification is provided to the user, and the algorithm then proceeds to 716. If it is determined that the tag and associated item are not authentic, the algorithm proceeds to 712 where a warning is generated for the user. In one exemplary embodiment, the warning can be provided for the user only, so as not to alert the seller. Likewise, the warning can be transmitted to law enforcement personnel or others. The algorithm then proceeds to 714, where the map is updated to reflect that the seller is selling merchandise that is not authentic. In addition, the user can also be provided with a discount off the price of the authentic merchandise that they were looking for, directions to another seller, a bounty or other suitable incentives to locate and report sellers of items that are not authentic. The algorithm then proceeds to 716.

At 716, it is determined whether the merchandise was purchased. In one exemplary embodiment, even if the merchandise is determined to not be authentic, the user can be instructed to purchase the merchandise as evidence, such as where notification has been provided to local authorities. If the user does not make a purchase, the algorithm proceeds to 718 and terminates. If the user does make a purchase, the algorithm proceeds to 720 where a prompt is generated for a payment type. In one exemplary embodiment, a user can make a payment using the NFC capabilities of the personal electronic device (such as by touching the user's personal electronic device to an electronic device of the seller), or in other suitable manners. The algorithm then proceeds to 722 where the transfer of the item from the seller to the buyer is recorded, and the algorithm terminates.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for conducting a raffle comprising:
    reading an item identifier from an identification tag affixed to an item using a processor or processors at an equipment management system, prior to an event related to the item;
    transmitting raffle notification data to a plurality of devices using the processor or processors if it is determined that the event has occurred, where the raffle notification data includes item identification data for the item;
    receiving a plurality of raffle ticket requests from the plurality of devices at the processor or processors in response to the raffle notification data;
    processing a plurality of raffle ticket sales for the plurality of ticket requests using the processor or processors;
    delivering a plurality of raffle tickets to the plurality of devices using the processor or processors;
    selecting one of the plurality of raffle tickets and transmitting winning notification data to the associated device using the processor or processors;
    reading the item identifier from the identification tag affixed to the item after the event using the equipment management system and the processor or processors;
    providing authentication data to one of the plurality of devices to verify that the item was in use during the event using the processor or processors.

2. The method of claim 1 wherein reading the item identifier from the identification tag affixed to the item at the equipment management system, prior to the event related to the item comprises reading a plurality of item identifiers from a plurality of identification tags affixed to a plurality of items at the equipment management system, prior to the event related to the plurality of items, and selecting one of the plurality of items for the raffle.

3. The method of claim 2 wherein selecting one of the plurality of items for the raffle comprises selecting one of the plurality of items for the raffle as a function of a player that performs a predetermined action during the event.

4. The method of claim 1 wherein transmitting the raffle notification data to the plurality of devices if it is determined that the event has occurred, where the raffle notification data includes the item identification data for the item comprises transmitting data that generates an alert on each of the plurality of devices.

5. The method of claim 1 wherein receiving a plurality of raffle ticket requests from the plurality of devices further comprises:
    determining whether a second request has been received from one of the plurality of devices; and
    rejecting the second request.

6. The method of claim 1 wherein receiving a plurality of raffle ticket requests from the plurality of devices further comprises:
    determining whether a second request has been received from one of the plurality of devices; and
    transmitting a notification to the device that transmitted the second request.

7. The method of claim 1 wherein processing the plurality of raffle ticket sales for the plurality of ticket requests comprises deducting a predetermined amount from a user account associated with one of the ticket requests.

8. The method of claim 1 wherein processing the plurality of raffle ticket sales for the plurality of ticket requests comprises generating a display with a number of remaining raffle tickets.

9. The method of claim 1 wherein processing the plurality of raffle ticket sales for the plurality of ticket requests comprises generating a display with a time remaining to purchase a raffle ticket.

10. The method of claim 1 wherein delivering the plurality of raffle tickets to the plurality of devices comprises:
    updating a user account with a raffle ticket identifier; and
    transmitting a notification to a user device associated with the user account.

11. The method of claim 1 wherein selecting one of the plurality of raffle tickets and transmitting winning notification data to the associated device further comprises generating a winner notification display on a stadium display device.

12. The method of claim 1 wherein reading the item identifier from the identification tag affixed to the item after the event at the equipment management system comprises:
    receiving the item from a player that used the item; and
    reading the item identifier from the identification tag affixed to the item by someone other than the player.

13. The method of claim 1 wherein providing the authentication data to the user with the item to allow the user to verify that the item was in use during the event comprises:
    transmitting the authentication data to a user account associated with the user;
    reading the item identifier from the identification tag of the item using the user device; and
    comparing the item identifier to an item identifier in the authentication data.

14. A method for conducting a raffle comprising:
reading an item identifier from an identification tag affixed to an item at an equipment management system using a processor or processors, prior to an event related to the item;
transmitting raffle notification data to a display using the processor or processors;
receiving a plurality of raffle ticket requests from the plurality of devices at the processor or processors in response to the raffle notification data;
processing a plurality of raffle ticket sales for the plurality of ticket requests using the processor or processors;
delivering a plurality of raffle tickets to the plurality of devices using the processor or processors;
selecting one of the plurality of raffle tickets and transmitting winning notification data to the associated device using the processor or processors;
reading the item identifier from the identification tag affixed to the item after the event using the equipment management system using the processor or processors;
providing authentication data to one of the plurality of devices to verify that the item was in use during the event using the processor or processors.

15. The method of claim 14 wherein reading the item identifier from the identification tag affixed to the item at the equipment management system, prior to the event related to the item comprises reading a plurality of item identifiers from a plurality of identification tags affixed to a plurality of items at the equipment management system, prior to the event related to the plurality of items, and selecting one of the plurality of items for the raffle.

16. The method of claim 15 wherein selecting one of the plurality of items for the raffle comprises selecting one of the plurality of items for the raffle as a function of a player that performs a predetermined action during the event.

17. The method of claim 14 wherein receiving a plurality of raffle ticket requests from the plurality of devices further comprises:
determining whether a second request has been received from one of the plurality of devices; and
rejecting the second request.

18. The method of claim 14 wherein receiving a plurality of raffle ticket requests from the plurality of devices further comprises:
determining whether a second request has been received from one of the plurality of devices; and
transmitting a notification to the device that transmitted the second request.

19. The method of claim 14 wherein processing the plurality of raffle ticket sales for the plurality of ticket requests comprises deducting a predetermined amount from a user account associated with one of the ticket requests.

20. The method of claim 14 wherein processing the plurality of raffle ticket sales for the plurality of ticket requests comprises generating a display with a number of remaining raffle tickets.

* * * * *